(12) United States Patent
Kim

(10) Patent No.: US 12,020,141 B2
(45) Date of Patent: Jun. 25, 2024

(54) DEEP LEARNING APPARATUS FOR ANN HAVING PIPELINE ARCHITECTURE

(71) Applicant: DEEPX CO., LTD., Gyeonggi-do (KR)

(72) Inventor: Lokwon Kim, Gyeonggi-do (KR)

(73) Assignee: DEEPX CO., LTD., Gyeonggi-do (KR)

( * ) Notice: Subject to any disclaimer, the term of this patent is extended or adjusted under 35 U.S.C. 154(b) by 932 days.

(21) Appl. No.: 16/104,081

(22) Filed: Aug. 16, 2018

(65) Prior Publication Data

US 2019/0095783 A1    Mar. 28, 2019

Related U.S. Application Data

(60) Provisional application No. 62/547,048, filed on Aug. 17, 2017.

(51) Int. Cl.
*G06N 3/063*    (2023.01)
*G06N 3/044*    (2023.01)
*G06N 3/047*    (2023.01)
*G06N 3/048*    (2023.01)
*G06N 3/088*    (2023.01)

(52) U.S. Cl.
CPC ............ *G06N 3/063* (2013.01); *G06N 3/044* (2023.01); *G06N 3/047* (2023.01); *G06N 3/048* (2023.01); *G06N 3/088* (2013.01)

(58) Field of Classification Search
CPC ..... G06N 3/063; G06N 3/0481; G06N 3/0472
See application file for complete search history.

(56) References Cited

U.S. PATENT DOCUMENTS

| 9,477,925 | B2 * | 10/2016 | Seide | G06N 3/08 |
| 2016/0196488 | A1 * | 7/2016 | Ahn | G06N 3/049 |
| | | | | 706/41 |
| 2018/0247186 | A1 * | 8/2018 | Fowers | G06F 9/3867 |

OTHER PUBLICATIONS

Kim et al. (A Fully Pipelined FPGA Architecture of a Factored Restricted Boltzmann Machine Artificial Neural Network, Feb. 2014, pp. 1-23) (Year: 2014).*
Wang et al. (Accelerating Recurrent Neural Networks: A Memory-Efficient Approach, Oct. 2017, pp. 2763-2775) (Year: 2017).*
Luo et al. (DaDianNao: A Neural Network Supercomputer, Jan. 2017, pp. 73-88) (Year: 2017).*

* cited by examiner

*Primary Examiner* — George Giroux
(74) *Attorney, Agent, or Firm* — INVENSTONE PATENT, LLC

(57) ABSTRACT

A deep learning apparatus for an artificial neural network (ANN) having pipeline architecture. The deep learning apparatus for an ANN simultaneously performs output value processing, corrected input data processing, corrected output value processing, weight correction, input bias correction, and output bias correction using pipeline architecture, thereby reducing calculation time for learning and reducing required memory capacity.

5 Claims, 17 Drawing Sheets

FIG. 2
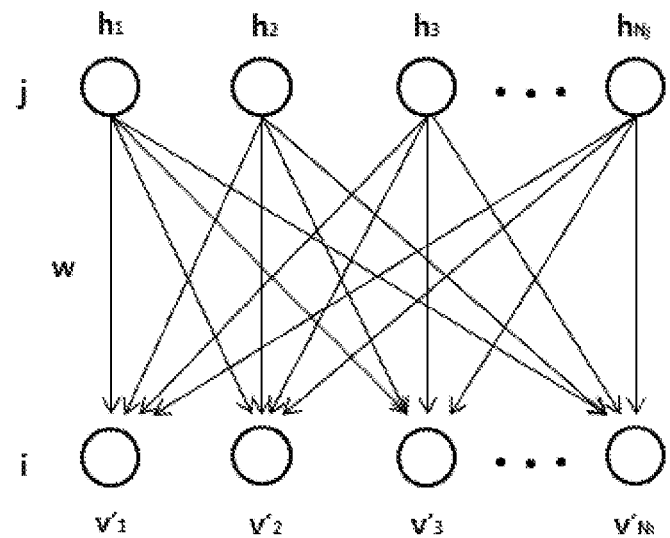
(a)
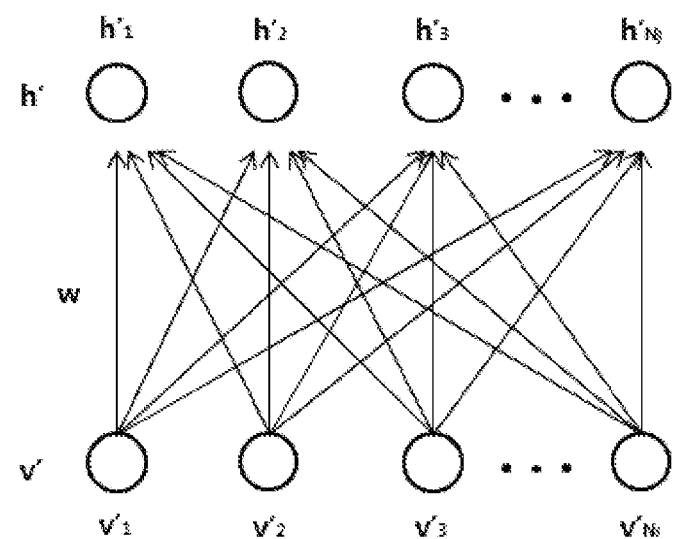
(b)

FIG. 17

PERFORMANCE COMPARISONS OF A PREVIOUS WORK AND THE PROPOSED ARCHITECTURE USING AN FPGA (XC2VP70) DEVICE

| Platform | Network size | Clock Frequency | Performance in CUPS metric | | | | CUPS Performance gain |
|---|---|---|---|---|---|---|---|
| | | | $N_c=1$ | $N_c=16$ | $N_c=128$ | $N_c=1024$ | |
| CPU using optimized C in [19] | 128x128 | N/A | 25.9M | | | | 1 |
| CPU using CUDA in [28] | 512x512 | N/A | 627M | | | | 30 |
| FPGA (XC2VP70) in [19] | 128x128 | 100 MHz | 1.58M | | | | 61 |
| Proposed Architecture (XC2VP70) | 128x128 | 168.699 MHz | 6.534G | 17.425G | 19.301G | 19.564G | 252.3 ~ 755.4 |

DEEP LEARNING APPARATUS FOR ANN HAVING PIPELINE ARCHITECTURE

CROSS-REFERENCE TO RELATED APPLICATION

This application claims the benefit of U.S. Provisional Application No. 62/547,048 filed in the United States Patent and Trademark Office on Aug. 17, 2017, the entire contents of which is incorporated herein by reference.

BACKGROUND

Field

The present disclosure relates, in general, to a deep learning apparatus for an artificial neural network (ANN) having pipeline architecture and, more particularly, to a deep learning apparatus for an ANN that can simultaneously perform output value processing, corrected input data processing, corrected output value processing, weight correction, input bias correction, and output bias correction using pipeline architecture, thereby reducing calculation time for learning and reducing required memory capacity.

Description

Artificial neural networks (ANNs) are based on statistical learning algorithms used in machine learning and cognitive science, inspired by biological neural networks (more particularly, the brains of animal central nervous systems). ANNs refer to the entirety of models, i.e. networks comprised of a combination of synapses of artificial neurons (or nodes), having problem-solving ability by changing the binding strength of the synapses through learning.

Among such ANN models, the restricted Boltzmann machine (RBM) is an algorithm proposed by Geoff Hinton, having applications in dimensionality reduction, classification, collaborative filtering, feature learning, and topic modeling.

In the RBM model, every hidden node of a hidden layer is connected to input nodes of visible layer, and every input node of a visible layer is connected to hidden nodes of a hidden layer. However, no nodes of the same layer are connected to each other.

In other words, the RBM model has no connection within the same layer. Due to this architecture, the term "restricted Boltzmann machine" is used. Every input node of the visible layer receives data input thereto, and decides the amount of data to be transferred to hidden nodes depending on probability (stochastic decision). It is decided whether to transfer the input (represented as "1") or to not transfer the input (represented as being "0"), depending on probability.

FIG. 1 illustrates the concept of the RBM model.

As illustrated in FIG. 1, when data v is input to input nodes i of a visible layer, products of the input data, input to the input nodes, and weights $w_{ij}$ are added up, according to hidden nodes j. Sums are subjected to an active function, e.g. a sigmoid function, to be sampled as 0 or 1, and are then output from hidden nodes j.

The RBM model learns major characteristics of the input data by adjusting the weights through unsupervised learning. The weights are adjusted by calculating error values v'h'−vh using the input data v, the output values h of the hidden nodes, corrected input data v' calculated through reconstruction, and a corrected output value h' calculated through regeneration.

FIG. 2 illustrates an example of adjusting weights in the RBM model.

Referring to FIG. 2A, all products of output values h of hidden nodes j of a hidden layer and weights $w_{ji}$ are added up in the reconstruction process, are sampled as 0 or 1 by an active function, and are then output as the corrected input data v' from input nodes i.

Referring to FIG. 2B, products of the corrected input data v' of the input nodes i and the weights $w_{ji}$ are added up through the regeneration process, are sampled as 0 or 1 by the active function, and are then output from the hidden nodes j as corrected output values h'.

Calculations of the output values h, the corrected input data v', the corrected output values h', as described above, are represented by Formulas 1, 2, and 3.

$$P(h_{cj}=1)=\sigma(\Sigma_{i=1}^{N_v} v_{ci} \times w_{ij} + b_j^h) \quad (1)$$

$$P(v'_{ci}=1)=\sigma(\Sigma_{j=1}^{N_j} h_{cj} \times w_{ji} + b_i^v) \quad (2)$$

$$P(h'_{cj}=1)=\sigma(\Sigma_{i=1}^{N_v} v'_{ci} \times w_{ij} + b_j^h) \quad (3)$$

In Formulas 1, 2, and 3, $h_{cj}$ indicates output values of hidden nodes j of an input case c, $N_v$ indicates the number of input nodes i, $v_{ci}$ indicates input data of the input case c, input to the input nodes i, $w_{ij}$ indicates weights between the input nodes i and the hidden nodes j, $b_j^h$ indicates input biases of the hidden nodes j, σ indicates an active function, for example, a logistic function.

In addition, $N_h$ indicates the number of the hidden nodes j, $h_{cj}$ indicates output values of the input case c, output from the hidden nodes j, $w_{ji}$ indicates weights between the hidden nodes j and the input nodes i, $b_i^v$ indicates output biases of the input nodes i, and $h'_{cj}$ indicates corrected output values of the input case c, output from the hidden nodes j.

The weights $w_{ij}$, the output biases $b^h$, and input biases $b^v$ are corrected using the output values h, the corrected input data v', and the corrected output values h', calculated as described above, to learn the characteristics of the input data. The weights, output biases, and input biases are corrected by Formulas 4, 5, and 6.

$$\Delta w_{ij} = (\varepsilon^w/N_c)(\Sigma_{c=1}^{N_c} v_{ci} \times h_{cj} - \Sigma_{c=i}^{N_c} v'_{ci} \times h'_{cj}) \quad (4)$$

$$\Delta b_i^v = (\varepsilon^{vb}/N_c)(\Sigma_{c=1}^{N_c} v_{ci} - \Sigma_{c=i}^{N_c} v'_{ci}) \quad (5)$$

$$\Delta b_j^h = (\varepsilon^{hb}/N_c)(\Sigma_{c=1}^{N_c} h_{cj} - \Sigma_{c=i}^{N_c} h'_{cj}) \quad (6)$$

Here, $N_c$ indicates the number of input cases of an input batch, and ε indicates a learning rate.

To reduce calculation time and improve learning efficiency in the ANN, weight correction is performed for an input batch, i.e. an assembly of input cases c respectively comprised of a plurality of pieces of input data.

ANN devices may mainly be categorized as one of two types. The first type of ANN device is based on a general purpose processor, such as a central processing unit (CPU) or a graphics processing unit (GPU). The second type of ANN device is provided by constructing a circuit, such as a synapse or a neuron, in the form of a field programmable gate array (RPGA) or an application specific integrated circuit (ASIC). ANN devices based on a general purpose processor have an advantage of being easily designable, due to having a small area, compared to the number of synapses provided, and the use of a conventional processor without a change. In addition, various forms of ANN devices can be provided by changing programs. However, ANN devices based on a general purpose processor have low calculation speeds due to low efficiency in parallel processing and distributed processing, compared to ANN devices in the form of a field-programmable gate array (FPGA) or an ASIC. In addition, ANN devices based on a general purpose processor are difficult to provide as a single chip and consume a large amount of power, which are problematic.

Providing an ANN using FPGA or ASIC technology is advantageous in that various types of ANN devices can be designed, depending on the purpose of use, and in that the ANN can have a shape similar to that of a theoretical model.

However, even in the case that an ANN device is provided using FPGA or ASIC technology, the amount of calculations or the capacity of memory necessary for an ANN algorithm may vary, depending on the design of the ANN device. Accordingly, there is great demand for an optimized calculating device for ANNs having architecture that can increase calculation speed and reduce required memory capacity.

The information disclosed in the Background section is only provided for a better understanding of the background and should not be taken as an acknowledgment or any form of suggestion that this information forms prior art that would already be known to a person skilled in the art.

BRIEF SUMMARY

Various aspects of the present disclosure provide a deep learning apparatus for an artificial neural network (ANN) having pipeline architecture, by which an ANN algorithm can be provided.

Also provided is a deep learning apparatus for an ANN having an optimized design, by which efficiency of calculation can be improved and unnecessary memory use can be reduced.

According to an aspect, a deep learning apparatus for an ANN may include: an input memory storing an input batch therein, the input batch being an assembly of input cases, each of which is comprised of a plurality of pieces of input data; a data processing module including a plurality of stages connected to each other, each of the stages being comprised of an combinational logic circuit and a register to correct weights between input nodes and hidden nodes using the input batch; and a controller generating a control signal, by which the pieces of input data of the input cases are input to the data processing module, or a control signal, by which an operation of each of the stages is controlled.

The data processing module may include: a first combinational logic circuit outputting output values to the hidden nodes of a hidden layer by applying weights to the pieces of input data, input to the input nodes of a visible layer; a second combinational logic circuit outputting corrected pieces of input data, corrected by applying weights to the output values; a third combinational logic circuit outputting corrected output values, corrected by applying weights to the corrected pieces of input data; and a fourth combinational logic circuit correcting weight errors using the pieces of input data, the output values, the corrected pieces of input data, and the corrected output values regarding entirety of the input cases of the input batch.

The data processing module may further include: a fifth combinational logic circuit correcting input biases using the pieces of input data and the corrected pieces of input data regarding the entirety of the input cases of the input batch; and a sixth combinational logic circuit correcting output biases using the output values and the corrected output values regarding the entirety of input cases of the input batch.

The second combinational logic circuit may include: a multiplier calculating products by multiplying the output values of the hidden nodes with the weights; an accumulator; and an adder calculating present cumulative values by adding the products to previous cumulative values stored in the accumulator, whenever the products are calculated by the multiplier. The previous cumulative values stored in the accumulator may be updated to the present cumulative values.

The second combinational logic circuit may include: a first buffer storing first buffering values obtained by adding the output biases to a final cumulative value calculated by the multiplier and the accumulator; an active function calculating active function values by sequentially receiving the first buffering values stored in the first buffer; a sampler calculating sample values by sampling the active function values output by the active function; and a second buffer storing the sample values sequentially calculated by the sampler.

The fourth combinational logic circuit may include: a partial weight calculator calculating partial weight correction values between the input nodes and the hidden nodes using the corrected output values of the hidden nodes when the corrected output values are output by the third combinational logic circuit; a partial weight storage sequentially storing the partial weight correction values between the input nodes and the hidden nodes whenever the partial weight correction values are calculated according to the input case of the input batch; and a corrector correcting, when calculation of the partial weight correction values between the input nodes and the hidden nodes regarding the entirety of the input cases of the input batch is completed, the weights between the input nodes and the hidden nodes using the calculation-completed partial weight correction values.

The partial weight calculator may calculate the partial weight correction values between the input nodes and the hidden nodes along a calculation path selected by the control signal generated according to a sequence of the input cases of the input batch.

The partial weight calculator may include: a first calculation path, along which the partial weight correction values between the input nodes and the hidden nodes are calculated by multiplying previous partial weight correction values, stored in the partial weight storage, with a momentum coefficient; a second calculation path, along which the partial weight correction values of the input nodes are calculated by adding weight error values to the previous partial weight correction values, stored in the partial weight storage; and a third calculation path, along which the partial weight correction values are calculated by subtracting products, obtained by multiplying previous weights between the input nodes and the hidden nodes with a weight reduction coefficient, from sums, obtained by adding the weight error values to the previous partial weights stored in the partial weight storage, and multiplying remainders with a coefficient of learning rate.

The controller may control calculation, so that the partial weight correction value regarding a first input case of the input batch is calculated along the first calculation path, the partial weight correction value regarding the last input case of the input batch is calculated along the third calculation path, and the partial weight correction values regarding the other input cases than the first input case and the last input case of the input batch are calculated along the second calculation path.

The deep learning apparatus may further include a standby memory storing the output values generated by the first combinational logic circuit or the corrected pieces of input data generated by the second combinational logic circuit.

The standby memory may include: a first standby memory storing the output values by a difference between a combinational logic circuit, among the combinational logic circuits, by which the output values are output, and a combinational logic circuit among the combinational logic circuits, by which the output values are used; and a second standby memory storing the corrected pieces of input data by a difference a combinational logic circuit among the combinational logic circuits, by which the corrected pieces of input data are output, and a combinational logic circuit among the combinational logic circuits, by which the corrected pieces of input data are used.

As set forth above, the deep learning apparatus for an ANN according to the present disclosure has the following effects.

First, the deep learning apparatus for an ANN can simultaneously perform output value processing, corrected input data processing, corrected output value processing, weight correction, input bias correction, and output bias correction using pipeline architecture, thereby reducing calculation time for learning.

Second, the deep learning apparatus for an ANN can calculate input data $v_i$ by accumulating products obtained by multiplying output values h, which are sequentially generated, and weights $w_{ji}$, so that neither calculation for transposing a matrix of weights $w_{ij}$, nor memory for storing the transposed matrix of weights, is necessary.

Third, in the case of weight correction in the fourth combinational logic circuit, whenever output values $h'_j$ are generated from hidden nodes j, the deep learning apparatus for an ANN can generate partial weight correction values between input nodes i and the hidden nodes j and correct weights by accumulating the partial weight correction values, for the entirety of sequentially-generated input cases. Accordingly, calculation time can be reduced, and memory capacity for storing all of corrected output values for all input cases is not required.

The methods and apparatuses of the present disclosure have other features and advantages that will be apparent from, or are set forth in greater detail in the accompanying drawings, which are incorporated herein, and in the following Detailed Description of the Invention, which together serve to explain certain principles of the present disclosure.

BRIEF DESCRIPTION OF THE DRAWINGS

The above and other objects, features and advantages of the present disclosure will be more clearly understood from the following detailed description when taken in conjunction with the accompanying drawings, in which:

FIG. 2 illustrates an example of adjusting weights in the RBM model;

FIG. 17 is a graph illustrating performance comparisons of the deep learning apparatus for an ANN having pipeline architecture according to the present disclosure and a conventional apparatus.

DETAILED DESCRIPTION

The technical or scientific terms used herein are for the purpose of describing particular exemplary embodiments only and are not intended to be limiting of the present disclosure. In addition, the technical or scientific terms used herein should be understood as having the same meaning as commonly understood by a person skilled in the art to which the present disclosure relates, and should not be interpreted in an overly broad or narrow manner, unless expressly so defined herein. If any technical terms used herein fail in correctly representing the idea of the present disclosure, they should be substituted with technical terms correctly understandable by a person skilled in the art to which the present disclosure relates.

Descriptions of components in the singular form used herein are intended to include descriptions of components in the plural form, unless explicitly described to the contrary. It will be understood that the terms "comprise," "include," and any variations thereof used herein shall not be interpreted as essentially including all components or steps described herein, and are intended to cover non-exclusive inclusions unless explicitly described to the contrary.

In addition, the accompanying drawings shall be interpreted as being provided for a better understanding, while not being limitative, of the principle of the present disclosure.

Hereinafter, a deep learning apparatus for an artificial neural network (ANN) having pipeline architecture according to the present disclosure will be described in more detail with reference to the accompanying drawings.

Figure 1:
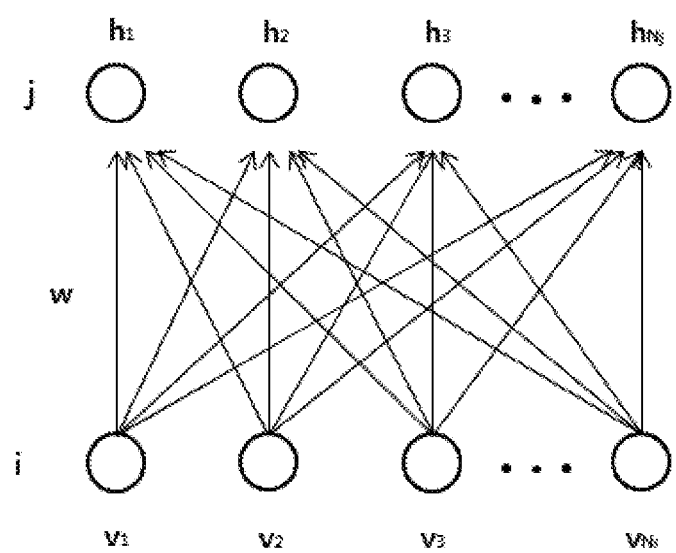
FIG. 1 illustrates the concept of an RBM model.
Figure 3:
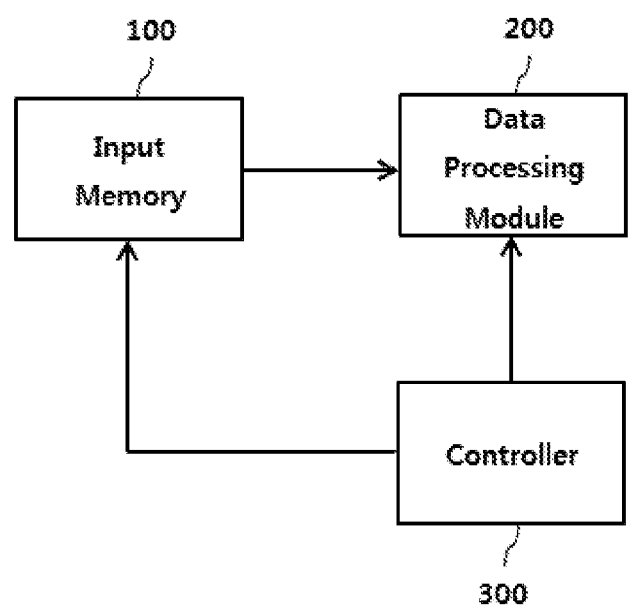
FIG. 3 is a block diagram illustrating the deep learning apparatus for an ANN according to the present disclosure.

FIG. 3 is a block diagram illustrating the deep learning apparatus for an ANN according to the present disclosure.

Described in more detail with reference to FIG. 3, an input memory 100 stores pieces of learning data to be learned. The pieces of learning data stored in the input memory 100 are input to a data processing module 200, grouped according to input batches, each of which is an assembly of input cases comprised of a plurality of pieces of input data.

The data processing module 200 includes a plurality of stages connected to each other, each of the stages being comprised of a combinational logic circuit and a register. Each of the stages corrects a weight between an input node and a hidden node, using an input batch.

A controller 300 generates a control signal, by which input data of input cases are input to the data processing module 200, or a control signal, by which the operation of each stage of the data processing module 200 is controlled, in synchronization with a clock signal. Specifically, the controller 300 generates a control signal, by which pieces of input data, stored in the input memory 100, are sequentially input to the data processing module 200, according to input cases of an input batch, in synchronization with the clock signal, or generates a control signal, by which the operation of an combinational logic circuit of each stage of the data processing module 200 is controlled, in synchronization with the clock signal.

The data processing module 200 corrects weights for extraction of characteristics of input data, by calculating an error value v'h'-vh from an output value h of the hidden node calculated by a generation process in response to the control signal, corrected input data v' calculated by a reconstruction process, and a corrected output value h' calculated by a regeneration process.

Figure 4:
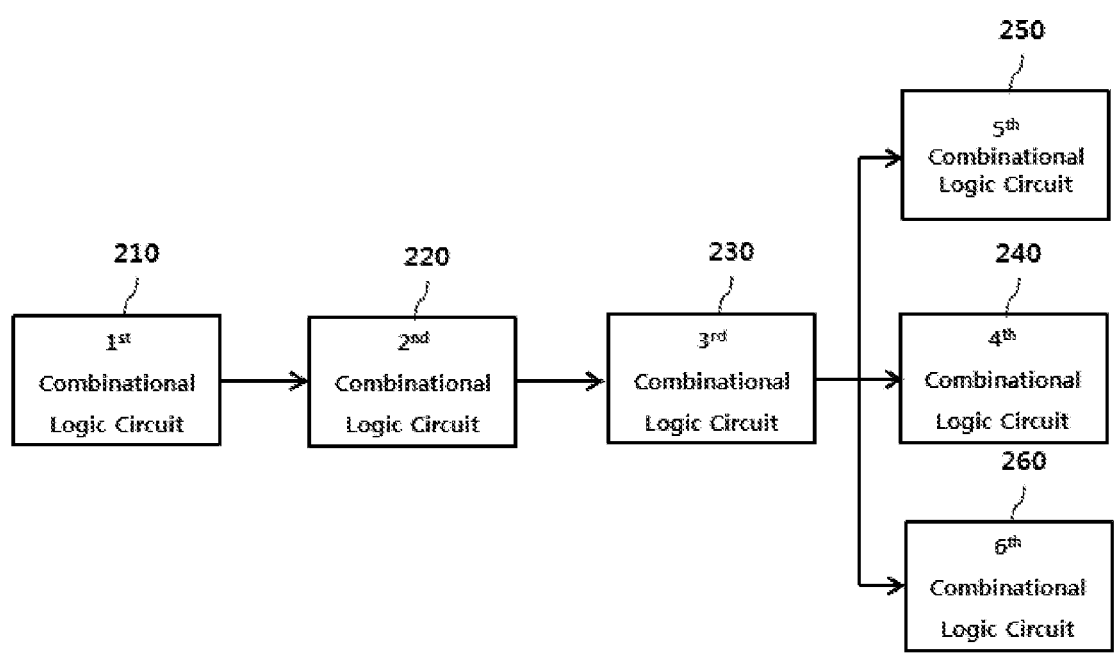
FIG. 4 is a block diagram illustrating the data processing module according to the present disclosure.

FIG. 4 is a block diagram illustrating the data processing module according to the present disclosure.

Referring to FIG. 4, the data processing module 200 according to the present disclosure includes: a first combinational logic circuit 210 outputting output values h to hidden nodes j of a hidden layer by applying weights $w_{ij}$ to pieces of data input to input nodes i of a visible layer (acting as an input layer); a second combinational logic circuit 220 outputting corrected pieces of input data v', corrected by applying the weights to the output values h; a third combinational logic circuit 230 outputting corrected output values h', corrected by applying the weights to the corrected pieces of input data v'; a fourth combinational logic circuit 240 correcting the weights using the pieces of input data v, the output values h, the corrected input data v', and the corrected output values h' regarding the entirety of input cases of an input batch; a fifth combinational logic circuit 250 correcting input biases $b^h$ using the pieces of input data v and the corrected pieces of input data v' regarding the entirety of the input cases of the input batch; and a sixth combinational logic circuit 260 correcting output biases b' using the output values h and the corrected output values h' regarding the entirety of the input cases of the input batch.

The data processing module 200 according to the present disclosure uses pipeline architecture, in which the data processing module is divided into the plurality of combinational logic circuits 210, 220, 230, 240, 250, and 260. Buffers may be provided between the divided combinational logic circuits 210, 220, 230, 240, 250, and 260, depending on the designed stage, to store inputs to and outputs from the combinational logic circuit. Each of the buffers between the combinational logic circuits acts as an output register of the preceding combinational logic circuit while acting as an input register of the subsequent combinational logic circuit.

The data processing module 200 according to the present disclosure is a synchronous digital system using the pipeline architecture illustrated in FIG. 4. The data processing module 200 processes data in a generation process, a reconstruction process, a regeneration process, a weight correction process, an input bias correction process, and an output bias correction process while increasing operation speed (clock speed). This is because continuous processing can be performed by the combinational logic circuits 210, 220, 230, 240, 250, and 260, provided by dividing the data processing module into six circuits, as illustrated in FIG. 4.

Figure 5:
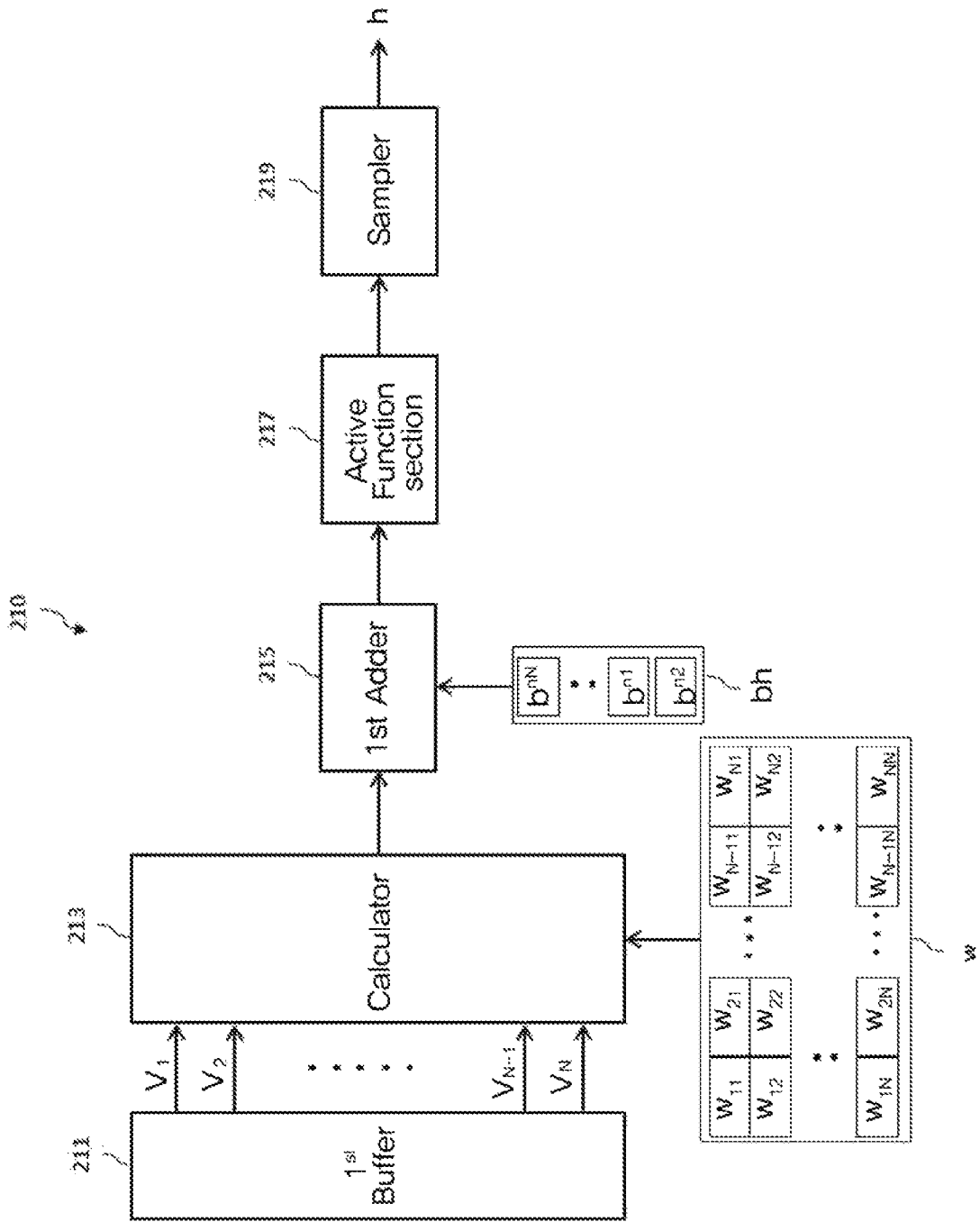
FIG. 5 is a functional block diagram illustrating the first combinational logic circuit according to the present disclosure, configured to perform a generation process.

FIG. 5 is a functional block diagram illustrating the first combinational logic circuit according to the present disclosure, configured to perform the generation process.

Described in more detail with reference to FIG. 5, pieces of input data $v_1, v_2, \ldots,$ and $v_N$ of input case c, stored in the first buffer 211, are input to the input nodes, respectively. A calculator 213 generates input data products regarding each of the hidden nodes j by multiplying the pieces of input data $v_1, v_2, \ldots,$ and $v_N$, input to the input nodes, with weights $w_{ij}$ between the input nodes i and the hidden nodes j, and adds up all of the input data products regarding each of the hidden nodes j, thereby outputting a sum regarding each of the hidden nodes j. The weights $w_{ij}$ are characterized as being stored in memory w, in the form of a matrix, categorized depending on the input case and the input data.

A first adder 215 adds the sum regarding each of the hidden nodes j and an input bias $b^h$ regarding each of the hidden nodes j, while an active function section 217 calculates a probability value between 0 and 1 by applying the value, obtained by adding the sum regarding the corresponding hidden node j and the input bias $b^h$ regarding the corresponding hidden node j, to an active function (e.g. a logistic function) having a sigmoid pattern.

A sampler 219 generates an output value h regarding each of the hidden nodes j, sampled as 0 or 1, by comparing the probability value calculated by the active function section 217 with a reference value.

Figure 6:
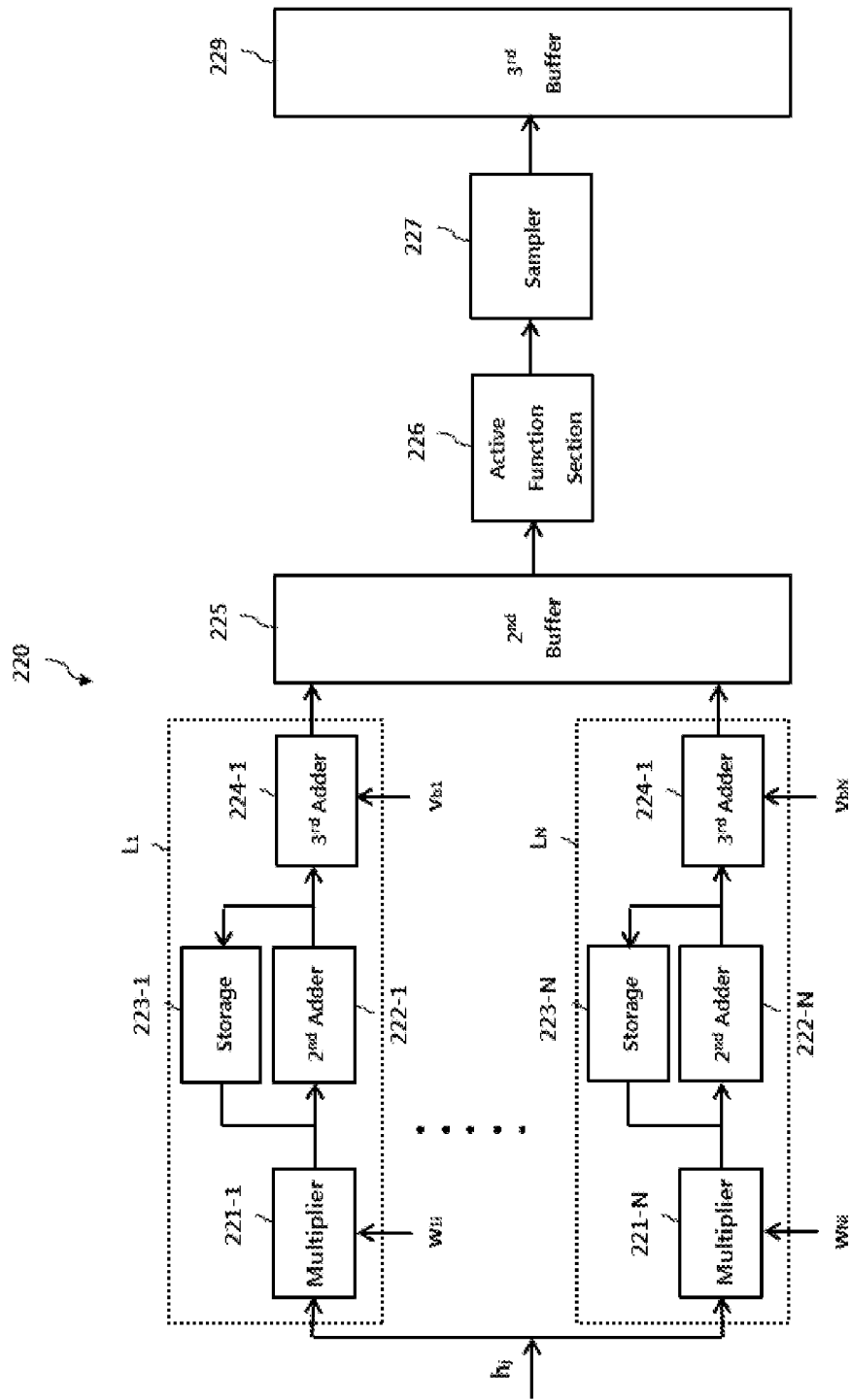
FIG. 6 is a functional block diagram illustrating the second combinational logic circuit according to the present disclosure, configured to perform a reconstruction process.

FIG. 6 is a functional block diagram illustrating the second combinational logic circuit 220 according to the present disclosure, configured to perform the reconstruction process.

As soon as the output values h are generated by the combinational logic circuit 210, the second combinational logic circuit 200 generates corrected pieces of input data v' regarding the input nodes i from the output values h. To generate the corrected pieces of input data v' regarding the input nodes i in the reconstruction process, the transposed weights and the output values of the hidden nodes $h_j$ must be multiplied. Accordingly, to generate the corrected pieces of input data regarding the input nodes i, in the memory w, separate memory for reading the weights between the hidden nodes j and the input nodes i and storing the transposed weights is necessary. The second combinational logic circuit 220 according to the present disclosure can generate the correct input data using multiply-accumulate implementation L, without separate memory for storing the transposed weights.

Described in more detail with reference to FIG. 6, at a point in time in which the output values h are output by the first combinational logic circuit, a multiplier 221, comprised of N number of multipliers 221-1 to 221-N, generates products by multiplying the output values of the hidden nodes j with the weights $w_{ji}$ between the hidden nodes j and the input nodes i. A second adder 222, comprised of N number of adders 222-1 to 222-N, generates sums by adding cumulative values, previously stored in a storage 223, comprised of N number of storages 223-1 to 223-N, to the products, respectively, and stores the sums in the storage 223. This multiply-accumulate process is performed until a final cumulative value is obtained, by multiplying an output value of the last hidden node with the weight between the last hidden node and the input nodes and then adding the product to the a cumulative value, previously stored in the storage 223.

A third adder 224, comprised of N number of adders 224-1 to 224-N, adds output biases by regarding the input nodes i to a final accumulative value, and store the sums in a second buffer 225. The values stored in the second buffer 225 are sequentially input to an active function section 226 and a sampler 227, thereby forming the corrected pieces of input data v'. The corrected pieces of input data v', sequentially generated as above, are stored in a third buffer 229.

In the third combinational logic circuit 230, the corrected pieces of input data v', stored in the third buffer 229, are subjected to a generation process the same as the generation process previously performed by the first combinational logic circuit 210, thereby generating the corrected output values h' of the hidden nodes.

Figure 7:
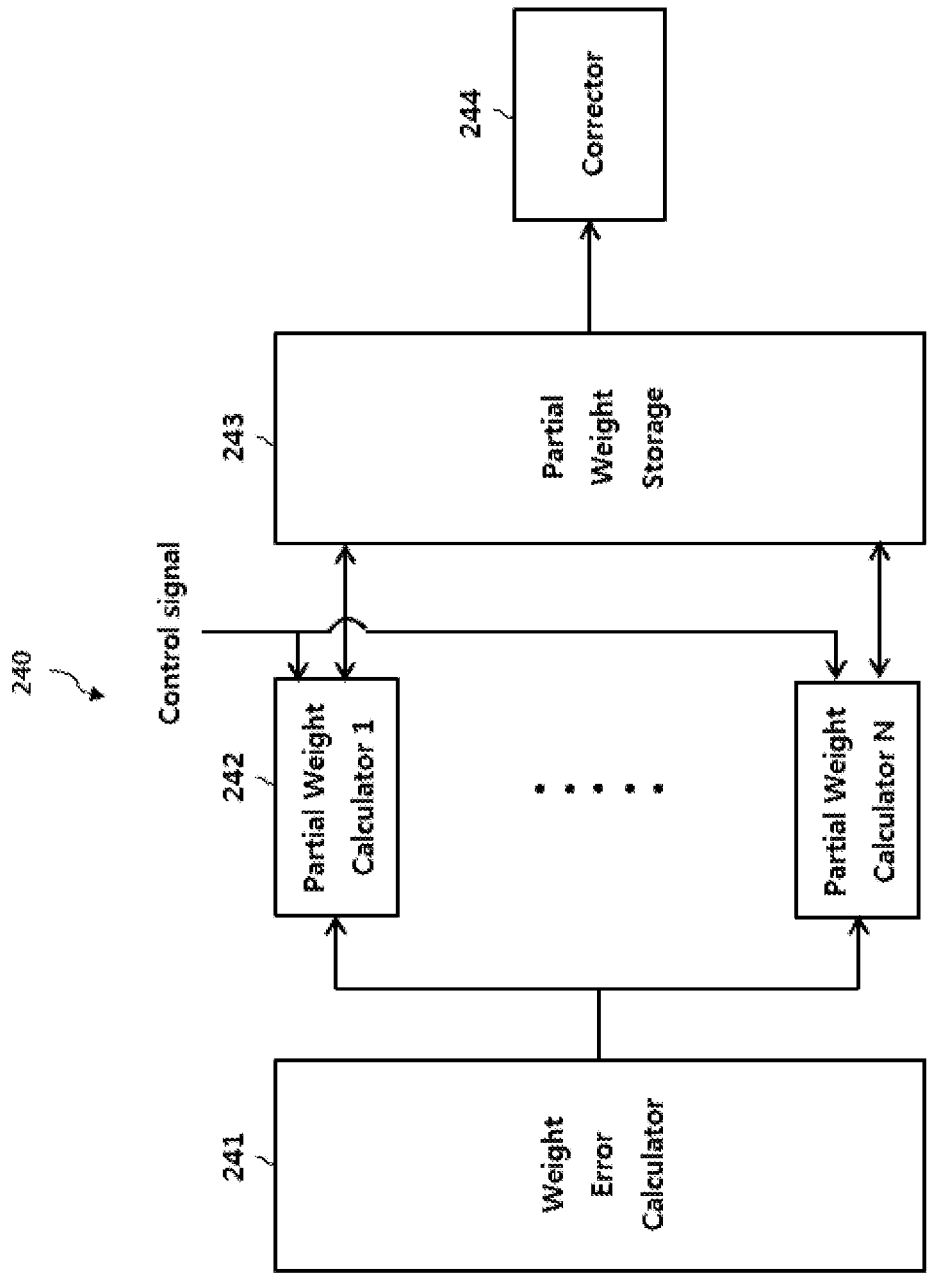
FIG. 7 is a functional block diagram illustrating the fourth combinational logic circuit according to the present disclosure.

FIG. 7 is a functional block diagram illustrating the fourth combinational logic circuit according to the present disclosure.

To correct the weights as in foregoing Formula 4, the entirety of the pieces of input data V, the output values h, the corrected pieces of input data v', and the corrected output values h' regarding the entirety of the input cases of the input batch are required. Thus, to calculate the weights, it is required to wait until calculations of the pieces of input data V, the output values h, the corrected pieces of input data v', and the corrected output values h' regarding the entirety of the input cases of the input batch are completed, and memory for storing the output values h, the corrected pieces of input data v', and the corrected output values h' regarding the entirety of the input cases is necessary.

According to the present disclosure, as soon as the corrected output values h' are generated from the hidden nodes j according to the input cases, the fourth combinational logic circuit 240 performs weight correction by sequentially calculating partial weight correction values Δw between the input nodes and the hidden nodes, according to the input cases, and adding up the partial weight correction values, including the partial weight correction value of the last input case, according to the input cases. It is thereby possible to reduce calculation time for weight correction while enabling weight correction without separate memory for storing the output values h, the corrected pieces of input data v', and the corrected output values h'.

Described in more detail with reference to FIG. 7, in the fourth combinational logic circuit 240 according to the present disclosure, when the corrected output values h' of the hidden nodes j are generated, a weight error calculator 241 calculates weight error values regarding the entirety of input nodes of the input case. The weight error values $E_c$ regarding input case c are calculated as in Formula 7, by subtracting the products of the corrected pieces of input data and the corrected output values from the products of the pieces of input data and the output values.

$$E_c = v_{ci} \times h_{cj} - v'_{ci} \times h'_{cj} \quad (7)$$

A partial weight calculator 242, comprised of N number of partial weight calculators 242-1 to 242-N, calculates the partial weight correction values Δw between the input nodes i and the hidden nodes j from the weight error values, based on input case-specific control signals provided by the controller.

A partial weight storage 243 sequentially stores the partial weight correction values between the input nodes i and the hidden nodes j whenever the partial weight correction values are calculated according to the input cases of the input batch.

When the calculation of the partial weight correction values between the input nodes i and the hidden nodes j regarding the entirety of the input cases of the input batch is completed, a corrector 244 corrects the weights between the input nodes i and the hidden nodes j using the calculation-completed partial weight correction values.

Figure 8:
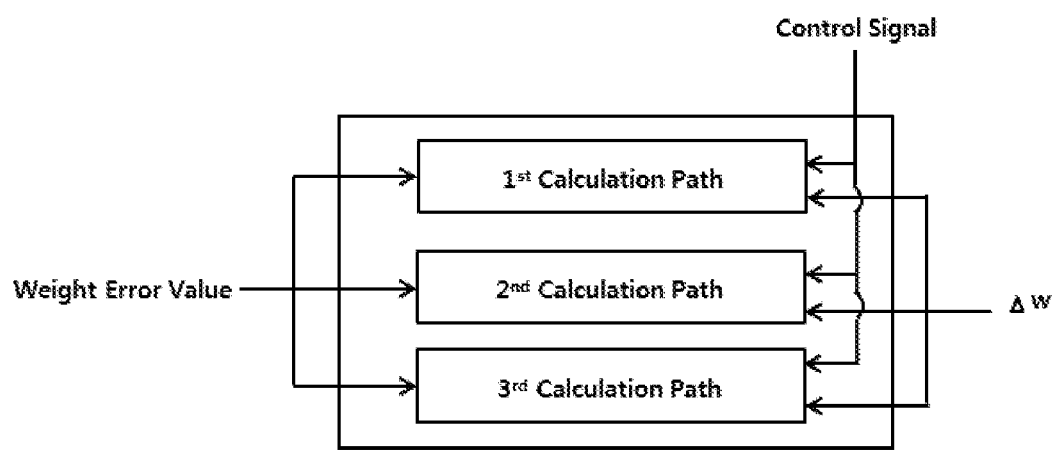
FIG. 8 is a functional block diagram illustrating an embodiment of the partial weight calculators according to the present disclosure.

FIG. 8 is a functional block diagram illustrating an embodiment of the partial weight calculator according to the present disclosure.

Described in more detail with reference to FIG. 8, the partial weight calculator calculates partial weight correction values according to the sequence of the input cases, along different calculation paths comprised of: a first calculation path, along which the partial weight correction values between the input nodes i and the hidden nodes j are calculated by multiplying previous partial weight correction values, stored in the partial weight storage 243, with a momentum coefficient $C_m$; a second calculation path, along which the partial weight correction values of the input nodes i are calculated by adding weight error values to the previous partial weight correction values, stored in the partial weight storage 243; and a third calculation path, along which the partial weight correction values are calculated by subtracting products, obtained by multiplying previous weights between the input nodes i and the hidden nodes j with a weight reduction coefficient $W_d$, from sums, obtained by adding the weight error values to the previous partial weights stored in the partial weight storage, and multiplying the remainders with a coefficient of learning rate ε.

The partial weight calculator calculates the partial weight correction values between the input nodes i and the hidden nodes j along one of the calculation paths, selected by the control signal generated according to the sequence of the input cases of the input batch.

The controller controls the process so that the partial weight correction value regarding a first input case of the input batch is calculated along the first calculation path 242-1, the partial weight correction value regarding the last input case of the input batch is calculated along the third calculation path 242-3, and the partial weight correction values regarding the other input cases than the first input case and the last input case of the input batch are calculated along the second calculation path 242-2.

Figure 9:
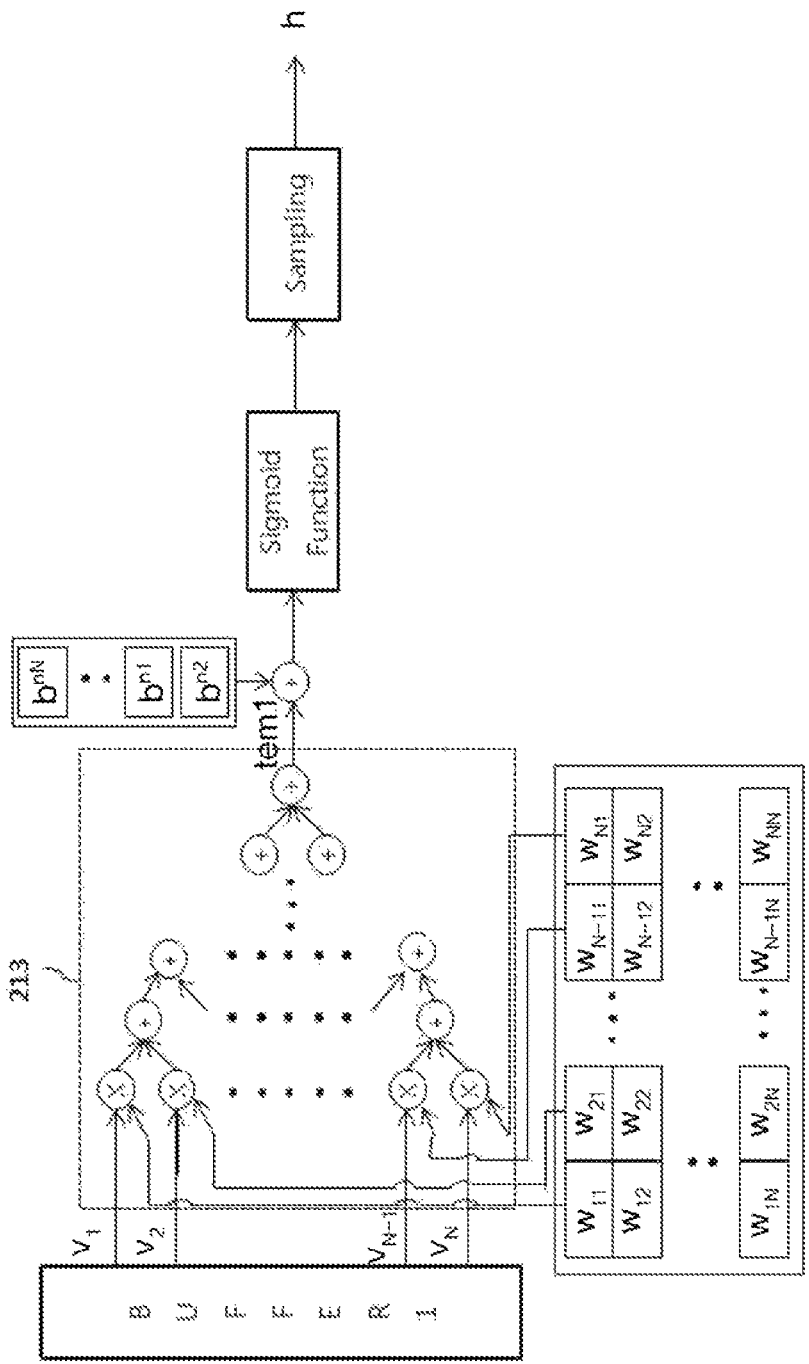
FIG. 9 illustrates an embodiment of the first combinational logic circuit according to the present disclosure.
Figure 10:
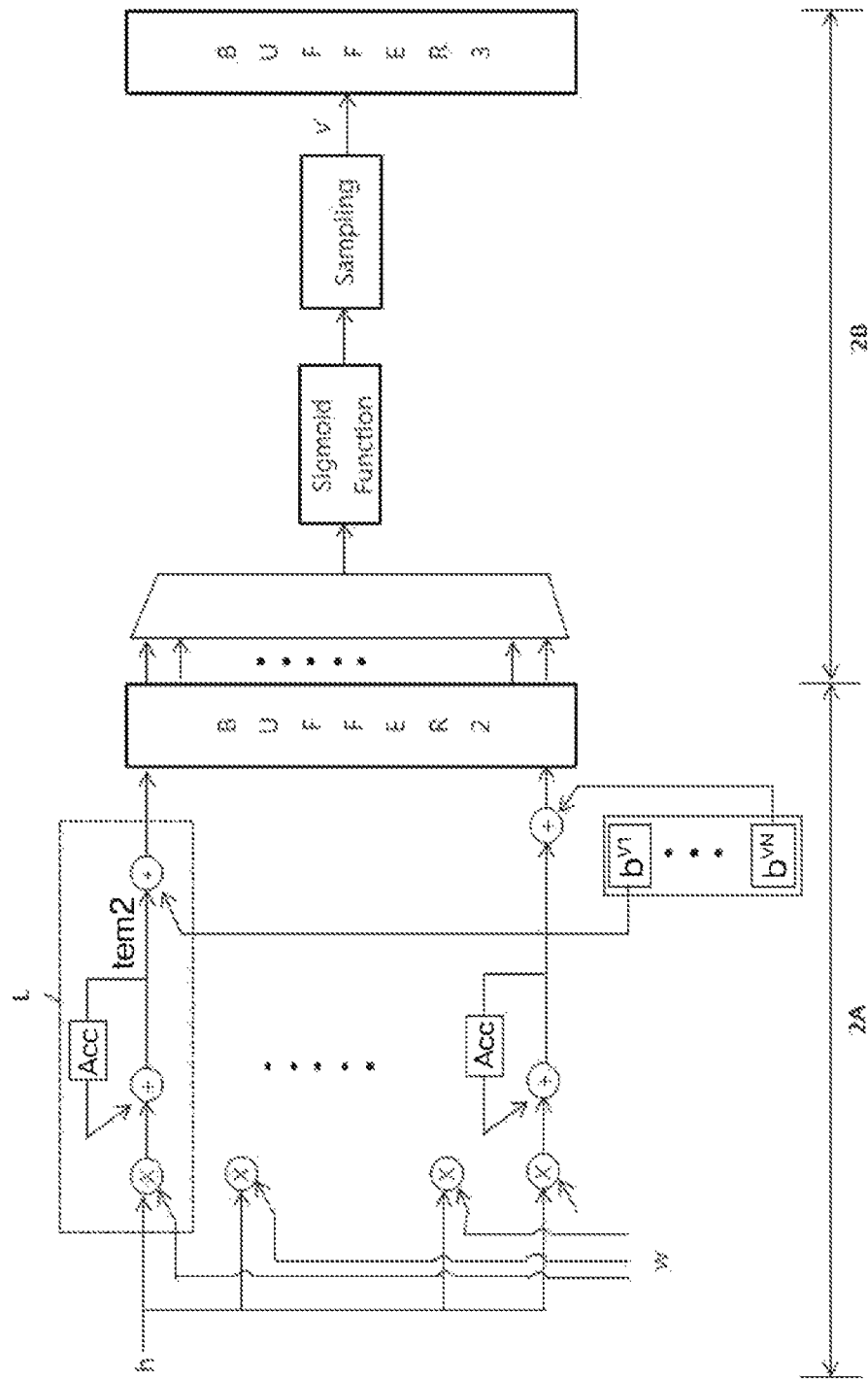
FIG. 10 illustrates an embodiment of the second combinational logic circuit according to the present disclosure.

FIG. 9 illustrates an embodiment of the first combinational logic circuit according to the present disclosure, and FIG. 10 illustrates an embodiment of the second combinational logic circuit according to the present disclosure. Codes for generating output values using the embodiment of the first combinational logic circuit and the embodiment of the second combinational logic circuit 2A and 2B are as follows.

```
for every case c (in serial)
    for every h-node j (in serial):
        # Phase 1
        tem1 = SUM_i {v[c][i]×W[i][j]}
        hprob = Sigmoid_function(tem1 + b^h[j])
        generate rand_value1
        if hprob > rand_value1
            h = 1
        else
            h = 0
        end if
        # Phase 2A
        if j=1
            tem2[i] = h×W[i][1]  #all i in parallel
        else if j=n
            tem2[i] += h×W[i][n]  #all i in parallel
            v^,[c][i] = Sigmoid_function(tem2[i] + b^h[i])
            #all i in parallel
        else
            tem2[i] + = h×W[i][j]  #all i in parallel
        end if
    end for -j
end for -c
```

As illustrated in FIG. 10, the combinational logic circuit is divided into 2A and 2B, with the second buffer being disposed between 2A and 2B. The sums, obtained by adding the output biases $b^v$ regarding the input nodes i to the final accumulative value tem$_2$ stored in the second buffer, are sequentially input to the active function section 226 and the sampler 227, thereby generating the corrected pieces of input data v'. Since the combinational logic circuit is divided into 2A and 2B, with the second buffer being disposed between 2A and 2B, it is possible to generate all of the corrected pieces of input data using the single active function section 226 and the single sampler 227.

Figure 11:
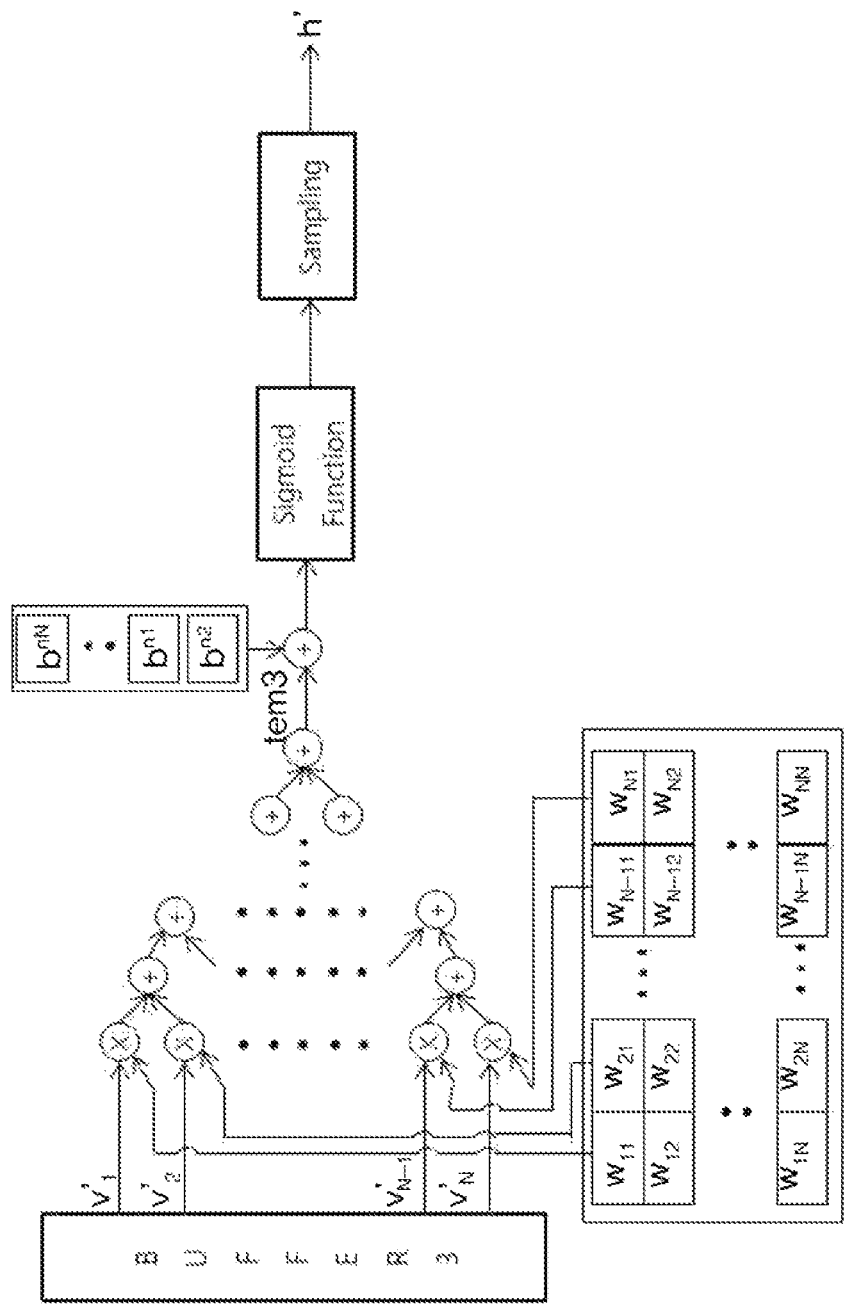
FIG. 11 illustrates an embodiment of the third combinational logic circuit according to the present disclosure.
Figure 12:
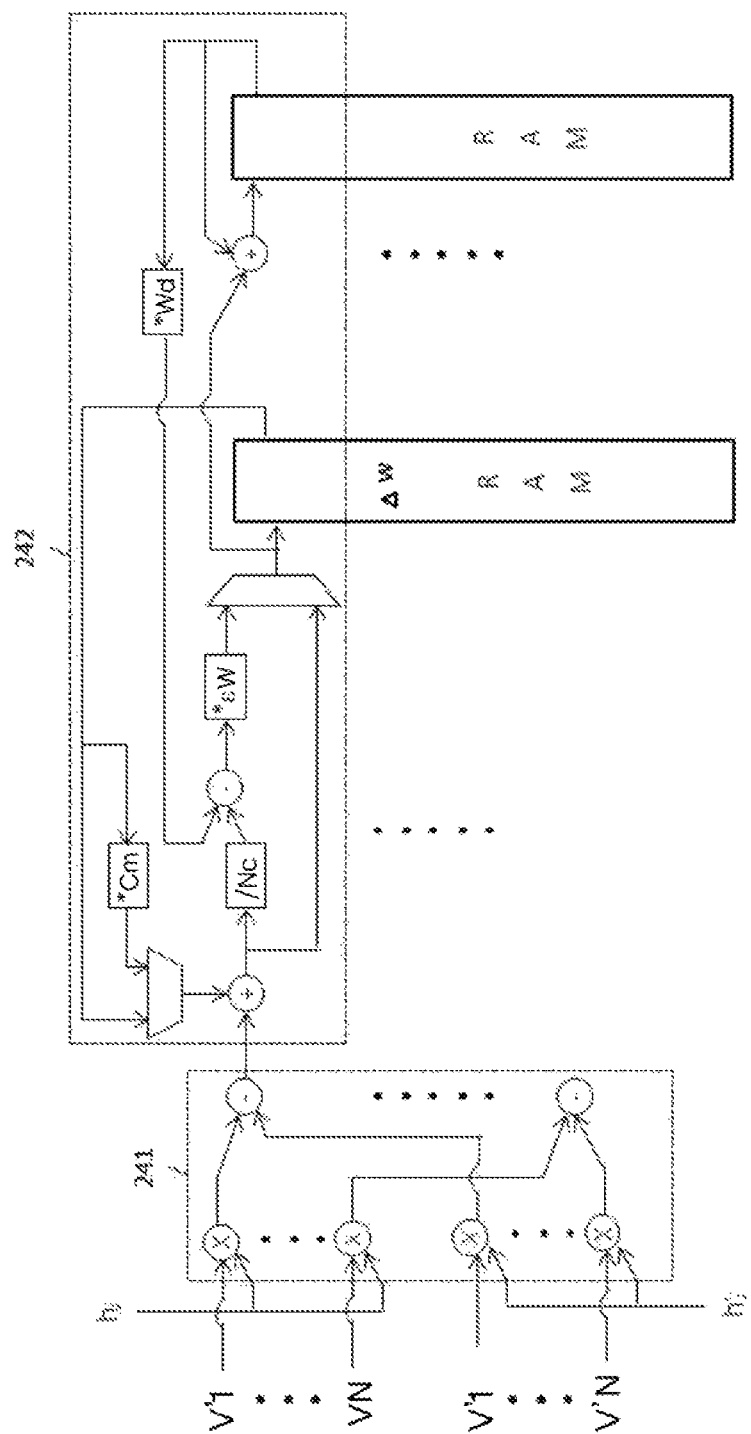
FIG. 12 illustrates an embodiment of the fourth combinational logic circuit according to the present disclosure.
Figure 13:
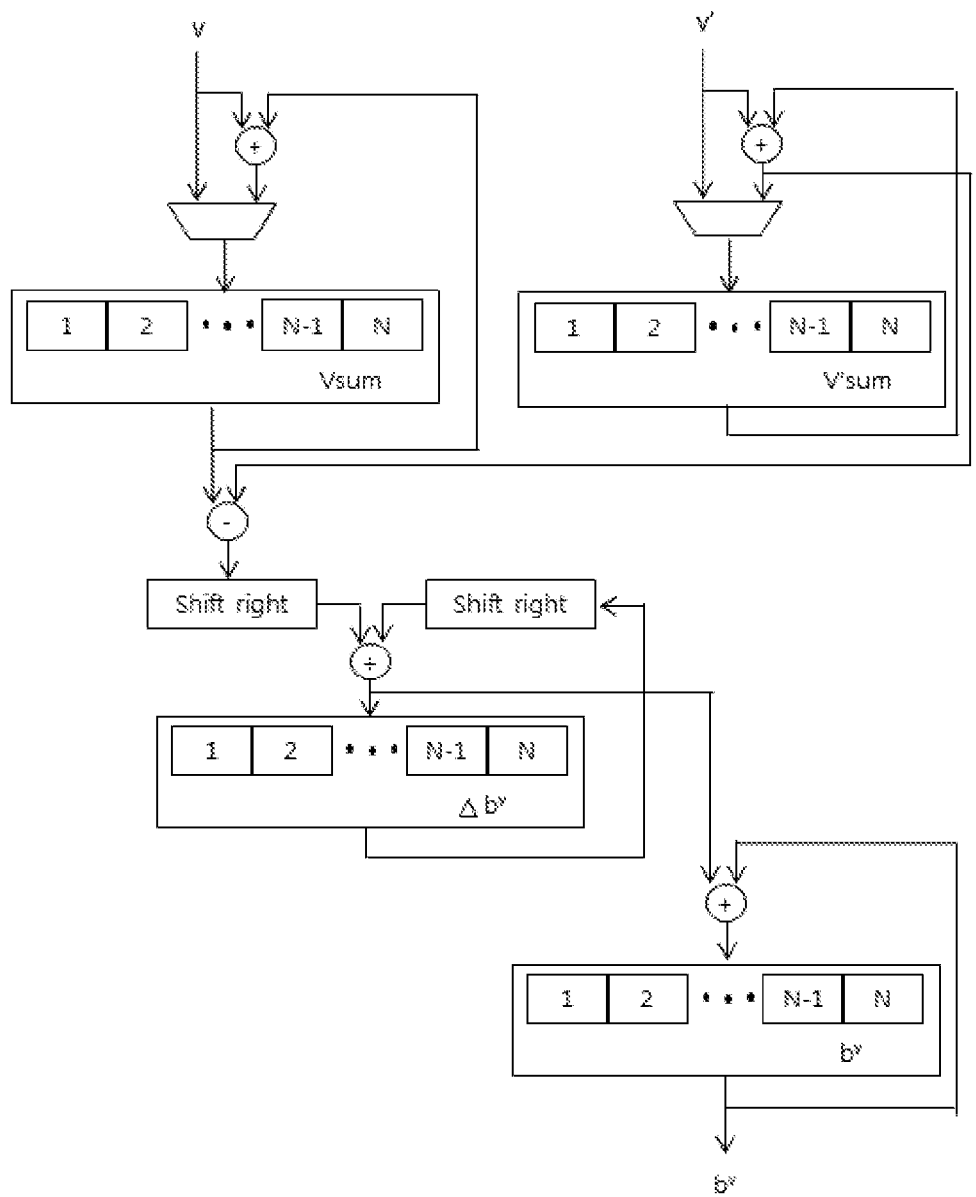
FIG. 13 illustrates an embodiment of the combinational logic circuit according to the present disclosure.

FIG. 11 illustrates an embodiment of the third combinational logic circuit according to the present disclosure, FIG. 12 illustrates an embodiment of the fourth combinational logic circuit according to the present disclosure, and FIG. 13 illustrates an embodiment of the combinational logic circuit according to the present disclosure. An embodiment of the sixth combinational logic circuit for updating output biases according to the present disclosure can be configured to be similar to the fifth combinational logic circuit.

Codes for correcting the weights using the embodiment of the fourth combinational logic circuit, illustrated in FIG. 12, are as follows.

```
for every case c (in serial)
    for every node j (in serial):
        if c=1
            ΔW[i][j] = CmxΔW[i][j] + (v[1][i]xh[1][j]...
            -v^,[c][i]xh'[1][j] #all i in parallel
        if c>1 and c < Nc
            ΔW[i][j] += (v[c][i]xh[c][j] - v^,[c][i]xh'[1][j])...
            #all i in parallel
        if c= Nc
            ΔW[i][j] = ε^W×(ΔW[i][j] + [Nc][i]×h[Nc][j]...
            -v^,[Nc][i]xh'[Nc][j]/Nc - WdxW[i][j]...
            #all i in parallel
            W[i][j] += ΔW[i][j] #alli in parallel
        end if
    end for -j
end for -c
```

Codes for correcting the input biases using the embodiment of the fifth combinational logic circuit, illustrated in FIG. 13, are as follows.

```
for c from 1 to Nc + 1 (in serial)
    for every v-node i (in serial):
        if c=1
            Vsum[i] = v[1][i]
        else if c=2
            Vsum[i] += v[2][i]
            V'sum[i] = v^,[1][i]
        else if c = Nc+1
            b^v[i] = b^v[i] + CmxΔb^v[i] + ...
            (ε^vb/Nc)×(Vsum[i] - V'sum[i] + v^,[Nc][i])
            Δb^v[i] = CmxΔb^v[i] + (ε^vb/Nc)×...
            (Vsum[i] - V'sum[i] + v^,[Nc][i])
        else
            Vsum[i] += v[c][i]
            V'sum[i] += v^,[c-1][i]
        end if
    end for -i
end for -c
```

Figure 14:
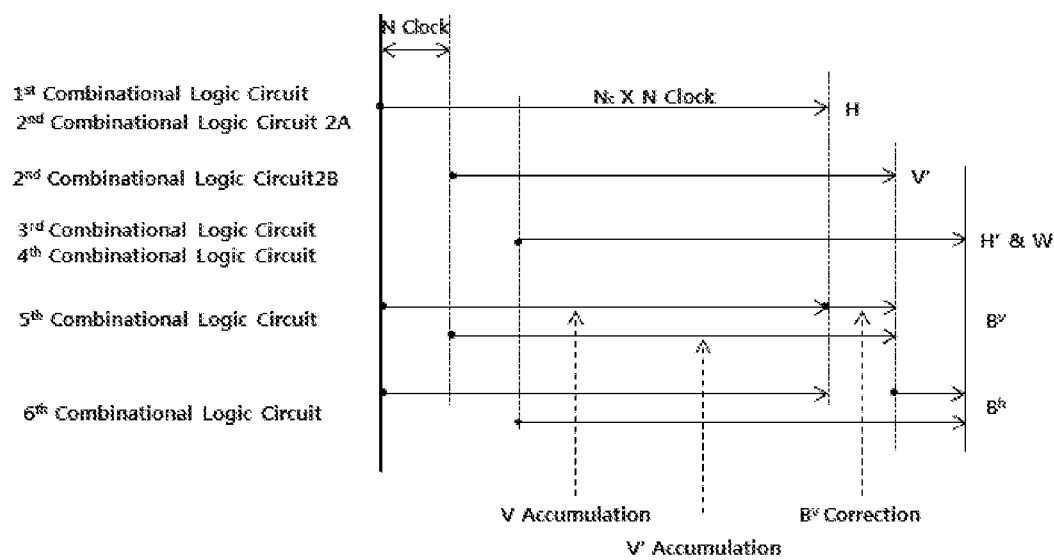
FIG. 14 illustrates time lines of the first to sixth combinational logic circuits according to the present disclosure.

FIG. 14 illustrates time lines of the first to sixth combinational logic circuits according to the present disclosure.

As illustrated in FIG. 14, N×N$_C$ clocks are used in each of the first to third combinational logic circuits, and (N+1)×N$_C$ clocks are used in each of the fourth and fifth combinational logic circuits. Thus, it can be appreciated that a total of (N+2)×N$_C$ clocks are used for the weight correction. Here, N indicates the number of the input nodes or output nodes (both the number of the input nodes and the number of the output nodes are assumed to be N, or the same, for the sake of brevity, although the number of the input nodes may differ from the number of the output nodes), and N$_C$ indicates the number of the input cases of the input batch.

In a conventional deep learning apparatus for an ANN, memories for storing the entirety of the pieces of input data, the output data, the corrected pieces of input data, and the corrected output values are necessary. This disadvantageously increases cost for providing the deep learning apparatus for an ANN. For example, a memory space of $N_C \times N_h \times BW_{data\text{-}path}$ is required to store the output values h.

Figure 15:
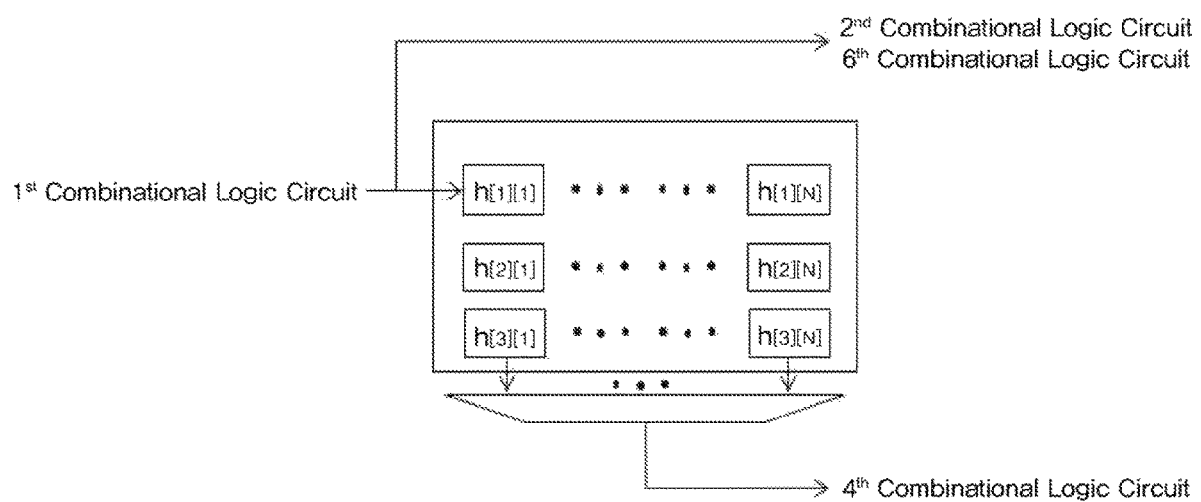
FIG. 15 illustrates a stage by which output values are generated and a stage by which output values are used.

The deep learning apparatus for an ANN having pipeline architecture according to the present disclosure can reduce the memory space in which the pieces of input data, the output values, and the corrected pieces of input data are stored, since each of the pieces of input data, the output values, and the corrected pieces of input data is stored across specific stages, ranging from a stage in which the data is generated to a stage in which the data is used. For example, as illustrated in FIG. 15, output values h generated by the first combinational logic circuit are used by the second, fourth, and sixth combinational logic circuits. In this case, neither the second combinational logic circuit nor the sixth combinational logic circuit needs a separate memory space for storing the output values, since both the second combinational logic circuit and the sixth combinational logic circuit use the output values as soon as the output values are generated. In addition, the difference in stages between the first combinational logic circuit, by which the output values h are generated, and the fourth combinational logic circuit, by which the output values h are used, is 2, a memory space for storing the output values h, in the form of three strings, is necessary.

Figure 16:
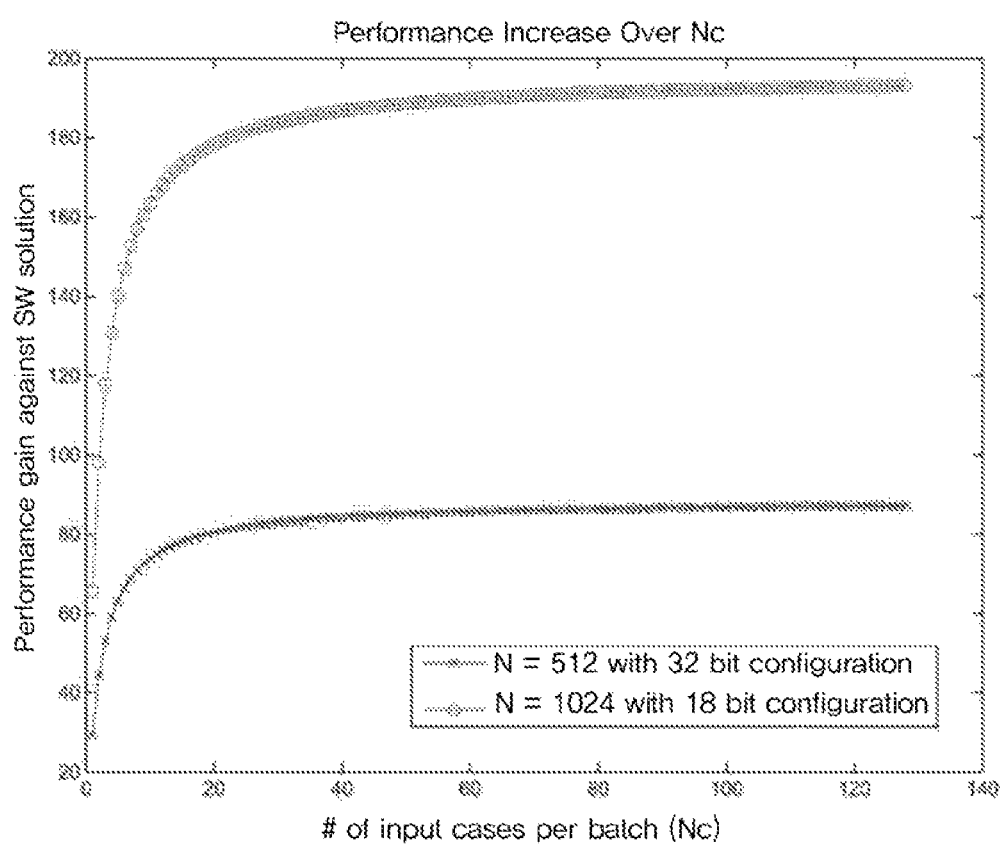
FIG. 16 is a graph illustrating improved performance of the deep learning apparatus for an ANN having pipeline architecture according to the present disclosure.

FIG. 16 is a graph illustrating improved performance of the deep learning apparatus for an ANN having pipeline architecture according to the present disclosure.

In FIG. 16, the X axis indicates the number of input cases per weight update, and the Y axis indicates corresponding performance improvement.

The present disclosure has significant improvement in performance over the related art even in the case that the number of input cases is 1. In the present disclosure, with increases in the number of input cases, performance improvement is saturated at a specific number of input cases after rapid improvement in performance. In the present disclosure, learning is performed in the unit of an input batch comprised of a plurality of input cases. Thus, when learning is performed using a plurality of input cases, higher performance improvement can be achieved.

Such performance improvement is enabled by the pipeline architecture of the present disclosure. Supposing input case 1, during reception of a first input, subsequent pipeline stages are in idle mode. When the first pipeline stage completes calculation of the first input, the second pipeline stage performs calculation while the other stages remain in idle mode. In contrast, in input case 2, after calculation by the first stage, calculation is performed by two stages. Accordingly, an increase in the input cases leads to an increase in operating pieces of hardware, thereby improving overall calculation performance.

FIG. 17 is a graph illustrating performance comparisons of the deep learning apparatus for an ANN having pipeline architecture according to the present disclosure and a conventional apparatus.

When performance, obtained using an RBM calculator implemented as an Intel central processing unit (CPU), is set to be 1 as a reference, it can be appreciated that performance, obtained using an RBM calculator implemented as a graphics processing unit (GPU), has an improvement in performance as high as 30 times the performance of the CPU. In addition, a conventional RBM calculator in the form of a field-programmable gate array (FPGA) provides an improvement in performance as high as 61 times the performance of the CPU. It can be appreciated that the RBM apparatus according to the present disclosure, in the form of an FPGA device, provides an improvement in performance as high as 755 times the performance of the CPU, 25 times the performance of the GPU, and 12 times the performance of the conventional FPGA device.

What is claimed is:

1. A calculating apparatus for accelerating an artificial neural network (ANN) calculation, the calculating apparatus comprising:
   an input memory configured to store an input batch, the input batch being an assembly of Nc input cases, each of which is comprised of a plurality of input data;
   a data processing module configured to apply weights to a plurality of Nc input cases of the input batch, the plurality of Nc input cases respectively input to a plurality of input nodes of an input layer using the input batch; and
   a controller configured to generate a control signal, by which each of the plurality of Nc input cases is input to the data processing module,
   wherein the control signal inputs each of the Nc input cases stored in the input memory sequentially to the data processing module,
   wherein performance of the calculating apparatus increases as a number of the Nc input cases of the input batch increases,
   wherein the weights are stored in a form of a matrix and categorized depending on the Nc input cases,
   wherein the data processing module comprises:
      a first combinational logic circuit outputting output values to hidden nodes of a hidden layer by applying weights to the input data sequentially input to the input nodes of a visible layer, the output values generated by the first combinational logic circuit being stored in a first standby memory;
      a second combinational logic circuit outputting input data corrected by applying weights to the output values, the corrected input data generated by the second combinational logic circuit being stored in a second standby memory; and
      a third combinational logic circuit outputting output values corrected by applying weights to the corrected input data,
      wherein the output values of the first standby memory are stored using a difference between (1) a combinational logic circuit of the combinational logic circuits by which the output values are output, and (2) a combinational logic circuit of the combinational logic circuits by which the output values are used,
      wherein the corrected input data of the second standby memory is stored using a difference between (3) a combinational logic circuit of the combinational logic circuits by which the corrected input data is output, and (4) a combinational logic circuit of the combinational logic circuits by which the corrected input data is used, and
      wherein the output values output by the first combinational logic circuit are used by the second combinational logic circuit without a separate memory space for storing the output values,
   wherein the data processing module further comprises another combinational logic circuit correcting weight errors using the input data, the output values, the corrected input data, and the corrected output values regarding an entirety of the input cases of the input batch, the other combinational logic circuit comprising:
      a weight error calculator calculating weight error values for the entirety of the input cases of the input batch;
      a partial weight calculator calculating partial weight correction values between the input nodes and the hidden nodes using the corrected output values of the hidden nodes when the corrected output values are output by the third combinational logic circuit, the partial weight correction values being calculated along a calculation path selected by the control signal generated according to a sequence of the input cases of the input batch;
      a partial weight storage sequentially storing the partial weight correction values between the input nodes and the hidden nodes whenever the partial weight correction values are calculated according to the input case of the input batch; and
      a corrector correcting, when calculation of the partial weight correction values between the input nodes and the hidden nodes regarding the entirety of the input cases of the input batch is completed, the weights between the input nodes and the hidden nodes using the calculation-completed partial weight correction values,
      wherein the partial weight calculator comprises:
         a first calculation path formed between the weight error calculator and the partial weight storage, along which the partial weight correction values between the input nodes and the hidden nodes are calculated by multiplying previous partial weight correction values, which are stored in the partial weight storage, with a momentum coefficient;
         a second calculation path formed between the weight error calculator and the partial weight storage in parallel with the first calculation path, along which the partial weight correction values of the input nodes are calculated by adding the weight error values to the previous partial weight correction values stored in the partial weight storage; and
         a third calculation path formed between the weight error calculator and the partial weight storage in parallel with the second calculation path, along which the partial weight correction values are calculated by subtracting products, obtained by multiplying previous weights between the input nodes and the hidden nodes with a weight reduction coefficient, from sums, obtained by adding the weight error values to the previous partial weights stored in the partial weight storage, and multiplying remainders with a coefficient of learning rate,
      wherein the control signal from the controller determines the calculation of the partial weight correction values along the selected calculation path, such that
         the partial weight correction value regarding a first input case of the input batch is calculated along the first calculation path, the partial weight correction value regarding a last input case of the input batch is calculated along the third calculation path, and the partial weight correction values regarding the input cases other than the first input case and the last input case of the input batch are calculated along the second calculation path, and wherein the combinational circuits of the data processing module are arranged in stages such that a two-stage difference exists between the first combinational logic circuit where the output values are output and the other combinational logic circuit where the output values are used.

2. The calculating apparatus according to claim 1, wherein the other combinational logic circuit is a fourth combinational logic circuit, and wherein the data processing module further comprises:
a fifth combinational logic circuit correcting input biases using the input data and the corrected input data regarding the entirety of the input cases of the input batch; and a sixth combinational logic circuit correcting output biases using the output values and the corrected output values regarding the entirety of input cases of the input batch.

3. The calculating apparatus according to claim 1, wherein the second combinational logic circuit comprises:
a multiplier calculating products by multiplying the output values with the weights;
an accumulator; and
an adder calculating present cumulative values by adding the products to previous cumulative values stored in the accumulator, whenever the products are calculated by the multiplier, wherein the previous cumulative values stored in the accumulator are updated to the present cumulative values.

4. The calculating apparatus according to claim 3, wherein the second combinational logic circuit comprises:
a first buffer storing first buffering values obtained by adding the output biases to a final cumulative value calculated by the multiplier and the accumulator;
an active function calculating active function values by sequentially receiving the first buffering values stored in the first buffer;
a sampler calculating sample values by sampling the active function values output by the active function; and
a second buffer storing the sample values sequentially calculated by the sampler.

5. The calculating apparatus according to claim 2, wherein the first through sixth combinational circuits of the data processing module are arranged in stages such that a first two-stage difference exists between the first combinational logic circuit where the output values are output and the fourth combinational logic circuit where the output values are used and such that a second two-stage difference exists between the second combinational logic circuit where the corrected input data are output and the fifth combinational logic circuit, the calculating apparatus further comprising:
the first standby memory storing the output values across the first two-stage difference between the first combinational logic circuit and the fourth combinational logic circuit where the output values are used; and
the second standby memory storing the corrected input data across the second two-stage difference between the second combinational logic circuit and the fifth combinational logic circuit.

* * * * *